C. H. STAUB.
SHOCK ABSORBER FOR VEHICLES.
APPLICATION FILED APR. 11, 1913.
1,069,587.
Patented Aug. 5, 1913.
2 SHEETS—SHEET 2.
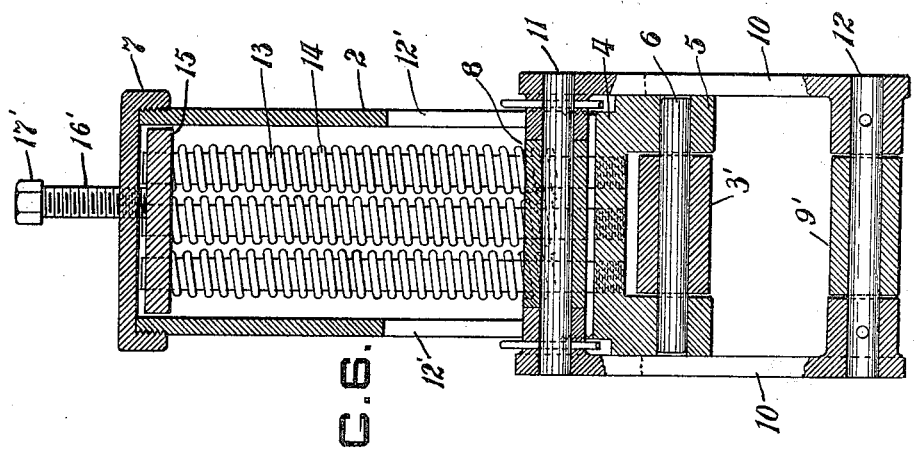
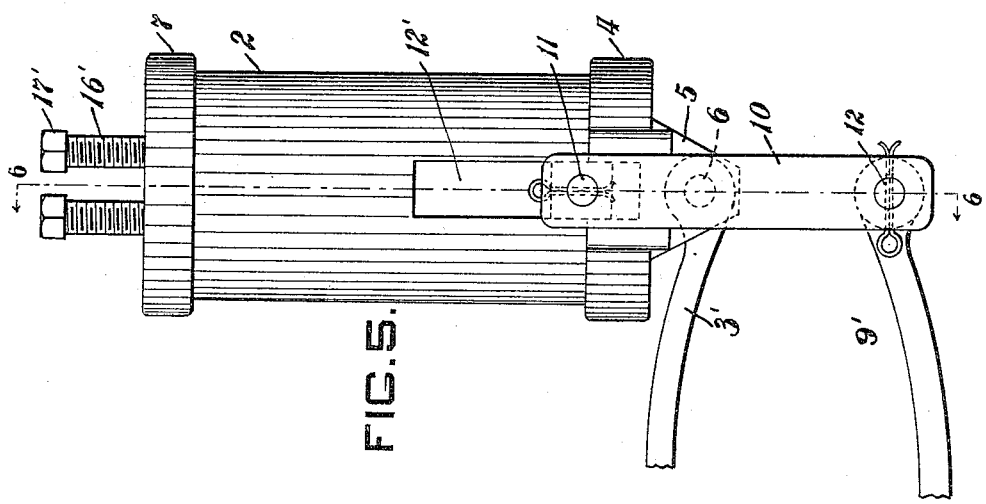
WITNESSES
A M Goodwin
C. I. Barth
INVENTOR
Charles H. Staub
by M. Arthur Keller
his attorney

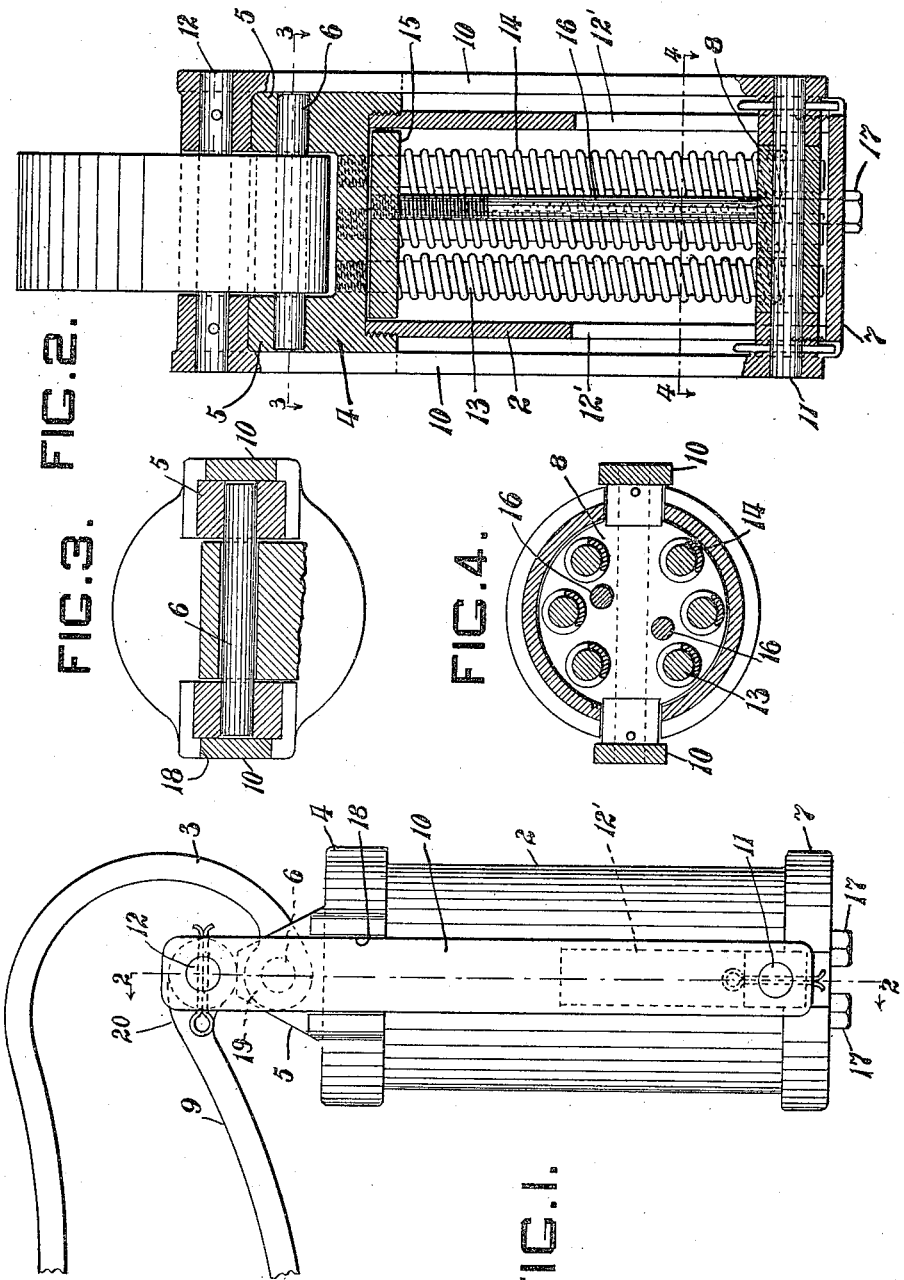

UNITED STATES PATENT OFFICE.

CHARLES H. STAUB, OF PITTSBURGH, PENNSYLVANIA.

SHOCK-ABSORBER FOR VEHICLES.

1,069,587.   Specification of Letters Patent.   Patented Aug. 5, 1913.

Application filed April 11, 1913. Serial No. 760,369.

*To all whom it may concern:*

Be it known that I, CHARLES H. STAUB, a citizen of the United States of America, residing at Pittsburgh, in the county of Allegheny and State of Pennsylvania, have invented new and useful Improvements in Shock-Absorbers for Vehicles, of which the following is a full, clear, and exact description, reference being had to the accompanying drawing, which forms part of this specification.

This invention is a new improved form of supplemental cushioning means or, more particularly, shock absorber for spring-suspended vehicles.

The general object of the invention is to provide a shock absorber of the character indicated which shall be not only responsive to small or light bumps or shocks but also to more severe shocks or stresses.

My device also affords means whereby the tension of the cushioning element may be regulated in conformity to requirements of vehicle mountings and loads and wear of parts.

I will now describe my invention, in connection with the accompanying drawing, so that others skilled in the art to which it appertains may understand and construct the same, it being premised however that changes may be made in the construction shown and described without departing from my invention.

Figure 1 is a side elevational view of a shock absorber embodying my invention and showing it as adapted for depending mounting at the rear of preferably the back springs of the vehicle; Fig. 2 is a transverse vertical sectional view on the line 2—2 of Fig. 1 but showing a portion of the spring or the top mounting member in elevation; Fig. 3 is a section on the line 3—3 of Fig. 2; Fig. 4 is a section on the line 4—4 of Fig. 2; Fig. 5 is a side elevational view corresponding with Fig. 1 but showing the shock absorber as adapted for mounting at the front of the vehicle; and Fig. 6 is a vertical sectional view on the line 6—6 of Fig. 5.

Referring to Figs. 1 to 4 inclusive, the reference numeral 2 indicates a cylindrical shell or casing which is suspended from the mounting bracket or spring end 3 of the vehicle through the medium of a cap or head piece 4 carrying upstanding lugs 5 which pivotally connect, as by means of pivot 6, with the member 3. This cylinder 2 also carries at its opposite end a suitable cap piece 7, and mounted for reciprocation in the cylinder 2 is a slidable head or piston 8 which connects with the other moving element of the vehicle or a spring leaf or bracket 9 through the intermediary of connecting links 10 which are pivoted to the head 8, as by means of pivotal rod 11, and connect at the upper end with the spring by pivot 12. The links 10 preferably connect with the head 8 through slots 12' diametrically formed in the wall of the casing 2, and carried by the mounting piece 4 are a plurality of rods 13 which are disposed symmetrically about the interior of the casing and pass through the head or piston 8 on each side of the pivot 11, as clearly shown in Fig. 4. Carried by these rods 13 are coil springs 14 which are interposed between the head or piston 8 and an adjusting or tension block 15 through which the rods 13 pass and which is capable of being vertically adjusted by means of bolts 16 which pass through the lower cap piece 7 and piston 8 and have screw-threaded connection with the member 15. The bolts 16 are provided with the usual head 17 by means of which, in the application of a wrench or any suitable tool, the bolts may be rotated and the block 15 adjusted to compress or open the springs 14 as the necessities of the case require.

The connecting links 10 preferably lie in a guideway 18 formed in the mounting member or head 4, so that any tendency to angular displacement of the shock absorber during shocks or operative compression of the members 3 and 9 of the spring or vehicle, is overcome.

It will be apparent that when a severe shock is transmitted to the spring members 3 and 9 the tendency is to bring the members together thereby causing the pivotal end portions 19 and 20 thereof to separate so that the links 10 will travel upwardly causing the head or piston 8 to act on or compress the springs 14 which, on account of their resilient nature, will absorb and dissipate the shock. Where the mounting of the vehicle, or the load placed upon the vehicle springs is such as to normally compress the springs 14 of the shock absorber to a certain extent, the block 15 may be adjusted so as to adapt the shock absorber, to these conditions.

In Figs. 1 and 2 the shock absorber is shown as embodied in that type which is usually employed at the rear of the back springs of the vehicle, the mounting being effected through the member 3 which may constitute, as above described, the rear end of a spring leaf or may form the mounting bracket usually attached to the chassis of the vehicle, while the member 9 may form the extended leaf or top strap of the spring.

In Figs. 5 and 6 I show the shock absorber as formed preferably for mounting at the forward or front end of the vehicle and extending upwardly instead of depending as in the case of the rear mounting just described. To adapt the shock absorber to this particular employment, the cylindrical member 2 or the shock absorber is reversed so as to cause the head piece 4 to occupy a lower position directly in pivotal engagement through the lugs 5 above described, with the spring member 3', with the links 10 which pivotally connect with the piston 8 depending into pivotal engagement with the spring portion 9'; and the spring adjusting block 15 is controlled by an adjusting screw 16' having a head 17'.

It will be seen that under compression of the spring members 3' and 9' the links 10 will be forced upwardly so as to lift the head or piston 8 against the tension of the springs 14, and where it is necessary to adjust the tension of the springs 14, this may be done by means of the bolt 16' as in the case of the bolt 16 above described.

The advantages of my invention will be found to reside in a shock absorber which is responsive to both slight and severe shocks and which has a great range of resiliency or flexibility due to the fact that I employed a plurality of small springs in the manner above described. It has been found that where a large spring is employed to counteract the blow from the vehicle spring ends in the delivery of shocks such springs are not responsive to lighter shocks and are stiff and unyielding in meeting severe shocks so that their action fairly negatives the purpose for which they are designed. Other advantages will be apparent, as the feature of adjustability and the simplicity of construction and mounting.

Having thus described my invention what I claim and desire to secure by Letters Patent is:

1. A shock absorber for vehicles comprising a cylinder having a head provided with lugs for attachment to one part of the vehicle, a piston mounted in the cylinder, a spring interposed between an end of the cylinder and the piston, a pin engaging through said lugs and with said part of the vehicle for pivotally connecting the lugs to the vehicle, and links connecting the piston with a second part of the vehicle and extending along the outside of the cylinder past the opposite ends of said pin and constituting the sole means for retaining said pin in position in said lugs, said head having guides projecting beyond the sides of the cylinder for engagement with said links to prevent the lateral swinging thereof.

2. A shock absorber for vehicles, comprising a cylinder provided with lugs for attachment to the vehicle chassis or suspension spring, a piston mounted in the cylinder, a plurality of rods circumferentially disposed about the interior of and mounted in said cylinder, a plurality of springs encircling said rods and disposed between an end of the cylinder and the piston, links connecting said piston to one end of the vehicle suspension spring, and pivotal mounting means carried by said lugs and confined by said connecting links against displacement.

3. A shock absorber for vehicles, comprising a cylinder provided with lugs for attachment to the vehicle chassis or suspension spring, said lugs having guideways formed therein, a piston mounted in the cylinder, a plurality of spiral springs circumferentially disposed about the interior of the cylinder and interposed between the piston and an end of the cylinder, means for adjusting the tension of said spiral springs, links connecting the piston with one end of the vehicle suspension spring and disposed in said guideways, and pivotal mounting means carried by said lugs and confined by said links against displacement.

In testimony whereof, I have hereunto set my hand in the presence of two witnesses.

CHARLES H. STAUB.

Witnesses:
 MARY A. BARTH,
 M. A. KELLER.

---

Copies of this patent may be obtained for five cents each, by addressing the "Commissioner of Patents, Washington, D. C."